United States Patent [19]
Robson

[11] 4,351,074
[45] Sep. 28, 1982

[54] POLLEN TRAP

[76] Inventor: Charles H. Robson, 6241 S. 30th St., Phoenix, Ariz. 85040

[21] Appl. No.: 236,916

[22] Filed: Feb. 23, 1981

[51] Int. Cl.³ .............................................. A01K 47/06
[52] U.S. Cl. ................................................ 6/1; 6/4 R
[58] Field of Search ............................. 6/1, 4 R, 12 M

[56] References Cited

U.S. PATENT DOCUMENTS

| | | | |
|---|---|---|---|
| 3,343,186 | 9/1967 | Dunand | 6/4 R X |
| 3,995,338 | 12/1976 | Kauffeld | 6/4 |
| 4,007,504 | 2/1977 | West | 6/4 R |
| 4,135,265 | 1/1979 | Van de Kerkof | 6/1 |

FOREIGN PATENT DOCUMENTS

| | | | |
|---|---|---|---|
| 472201 | 1/1976 | Australia . | |
| 1223455 | 6/1960 | France . | |
| 2055542 | 3/1981 | United Kingdom | 6/4 R |

OTHER PUBLICATIONS

"C.A. C. Pollen Trap", M. V. Smith, Jun. 14, 1965.
"Farmnote", S. R. Chambers, Mar. 1977.
"Making and Using a Pollen Trap", E. R. Jaycox, Mar. 1977.
"Feeding Bees", E. A. Karmo, Dec. 1974.
"Instructions For Use . . . ", J. Matthenius, Jr., Feb. 1975.
"Trapping Pollen . . . ", B. F. Detroy et al., 1976.

Primary Examiner—Gene Mancene
Assistant Examiner—Robert P. Swiatek
Attorney, Agent, or Firm—Joseph H. Roediger

[57] ABSTRACT

Pollen trapping apparatus for placement at different levels within a segmented bee colony. The apparatus includes a centrally located pollen trap with an overlying scraper wherein both trapping and non-trapping operations can be performed by changing the position or orientation of the scraper without removing the apparatus from the colony.

13 Claims, 10 Drawing Figures

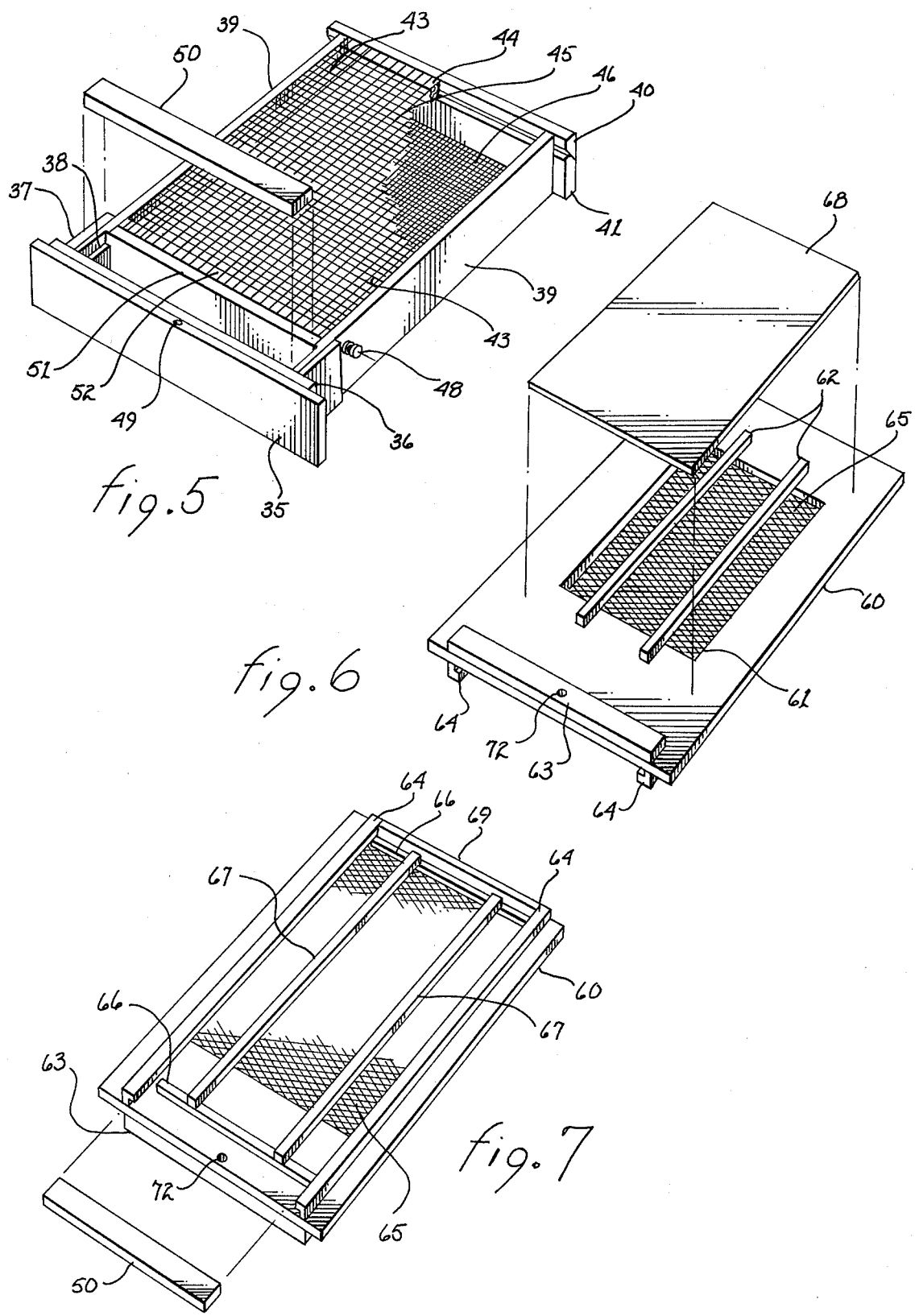

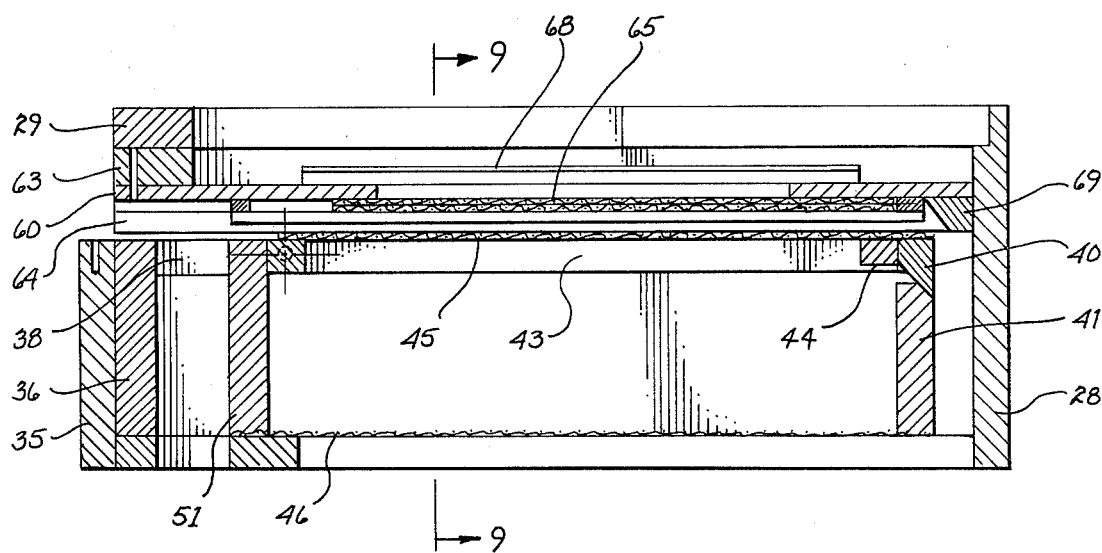

POLLEN TRAP

BACKGROUND OF THE INVENTION

This invention relates to apparatus utilized for trapping and harvesting pollen in a honeybee colony.

Beekeepers recognize that bees depend on honey for their carbohydrate food component and pollen for their protein requirements. Typically, these items are collected and later made available to the bee colony during periods of short supply. In addition, trapping of pollen has been utilized to determine the types of plants visited by the bees and to study the relative importance and yields of plant types in a given area.

Recently, the proteinaceous character of pollen has been recognized as making pollen highly beneficial to the human diet. This recognition has generated increasing interest in ways to efficiently and effectively trap and harvest pollen on a commercial basis. To this end, a variety of different pollen traps have been described in the literature and tested in the bee colonies.

A pollen trap is a device placed in the travel path of honey bees returning to their colony after foraging. The bees carry pollen in pouches on their legs. To effect removal of pollen from the bees, one or more mesh screens are placed in their travel path. As the bees crawl through the screen the pollen is dislodged from their legs and is collected in a container made inaccessible to the bees by a fine mesh covering.

The collection of pollen on a large scale commercial basis requires that effective pollen trapping be accomplished by a structure that is compatible with commercial equipment presently utilized and be multi-functional so that it does not require dismantling of the colony during normal operation. Thus, it is highly desirable that a trap be capable of being utilized at the bottom, top or in a mid-range position in a bee colony and to have trapping and non-trapping capabilities in each position. Further, the use of a pollen trap should minimize any disturbance of the honeybee colony or the normal flight path of the bee. In addition, it is recommended that the trap employed interfere as little as practical with the required ventilation pattern within the bee colony and particularly within the region surrounding the container of trapped pollen.

One general type of pollen trap known to the industry requires the structure to be placed outside the bee colony. An example of this type is described in U.S. Pat. No. 3,995,338 wherein adjacent pollen and trash containers are positioned beneath spaced vertical screens and located outside the colony. A disadvantage common to external traps is that the pollen is exposed to adverse climatic conditions, in particular to moisture which can render the accumulated pollen unusuable. Also, outside traps must be removed from the area by the operator during periods in which the crops are being sprayed for pesticide or weed control.

Pollen traps which can be included within the bee colony and are thus protected from the adverse climatic conditions and various chemical substances in the area are preferred for commercial use. As a result, a number of bottom traps have been described in the literature. The typical manner of providing for the bottom trapping of pollen is to incorporate a pollen scraping screen at or proximate to the bee entrance to the colony with a trapping container incorporated in the base of the colony. In structures wherein the trapping container is positioned just below the bee entryway the pollen is likely to be rendered unsuitable for sale as a result of either exposure to the environment or lack of adequate ventilation. In many bottom traps, the pollen is subject to contamination by external sources or by trash generated within the colony by the bees. Also, small animals and insects are often able to invade the trapping container of modified base structure colonies.

Accordingly, the present invention is directed to the provision of a pollen trap that can be included in the bee colony at top, intermediate or bottom trapping positions within the colony. The present trap conforms to the dimensions of the conventional colony and thus can be positioned on and employed with the colony base to elevate the trapping container from ground level. The container is mounted within the structure so as to provide protection from adverse environmental conditions. In addition, the present pollen trap permits the beekeeper to engage in either trapping or non-trapping operations without requiring removal of the structure from the colony.

SUMMARY OF THE INVENTION

The present invention is directed to pollen trapping apparatus which is dimensioned to fit within a conventional segmented bee colony and permits the beekeeper to engage in the trapping and non-trapping of pollen at different levels within the colony according to his preferred manner of operation.

The pollen trap includes a housing member which is dimensioned to fit in the stack of hives which forms a segmented bee colony. The housing includes a drawer slidably mounted in the front wall thereof. A pollen trap container is centrally mounted within the drawer so as to be spaced from the front, sides and back members of the housing when the drawer is inserted therein.

The pollen trap container has a foraminous upper surface containing a large number of small openings through which pollen can pass. The openings in this surface are smaller than the size of the bee so that access to the interior of the container is denied to the bees. A scraper means, including typically two mesh screens mounted in an offset manner with respect to each other, is mounted within the housing in spaced overlying relationship to the upper surface of the pollen trap. The scraper means can be moved between first and second positions in the housing and can also be withdrawn and turned over for reinsertion into the housing.

When in the first position, the scraper means extends between the front and back walls of the housing so that any bees traveling upward must pass through the scraper means thereby dislodging the pollen carried on their bodies. In the second position, the scraper means is partially withdrawn from the housing so that the rear edge thereof is spaced from the back wall of the housing. This spacing permits the bees to bypass the scraper screens and the drawer via this rear vertical passageway. Also, the scraper means is provided with an access control member mounted near the rear edge thereof. This member extends downwardly from the scraper means to the pollen trap when the scraper means is in the second position. As a result, the rear vertical passageway does not communicate with the region between the upper surface of the pollen trap and the scraper screens.

The scraper means is further provided with an entry blocking member affixed to one side and mounted near its front edge. The front edge portion of the opposing side of the scraper means is adapted to receive a removable blocking bar when positioned therein. The combination of the fixed and removable blocking members is utilized to control the access paths of the bees to the colony when the scraper means is in the first and second positions and in the normal or rotated positions. The rotation of the scraper means along with the fixed and removable front housing wall blocking members and the movable scraper means permit this pollen trap to be utilized in both the trapping and non-trapping modes of operation without requiring the disassembling of the conventional segmented bee colony.

In operation, the present invention can be placed on the colony supporting base with the trapping function provided for bees entering from the base entryway. The removable blocking bar is moved to the base entryway from the top of the scraper means for non-trapping operation. As a mid-position trap, the scraper means is rotated and in the partially withdrawn or second position. As a result, access to the colony is provided between the drawer and scraper means. The removable blocking member is placed behind the front of the drawer and in front of the pollen trap. In addition, the base entryway is blocked by an additional blocking bar inserted into the base entry opening. The non-trapping operation in this mid-position requires the removal, rotation, and replacement of the scraper means in the housing. The base entry need not be blocked for this mode of operation.

For the top trap operation, the cover for the top hive in the colony is placed on the open housing of the invention and the scraper means is positioned in the second position. The removable blocking bar is again inserted into the drawer. The base entry is also blocked as mentioned in connection with the middle trap operations. To provide non-trapping operation in the top trap position, the scraper means is moved to its first position and the removable blocking bar is removed from behind the front wall of the drawer.

Thus, the present pollen trap is capable of performing the trapping and non-trapping operations when positioned by the beekeeper at different levels in the colony. The pollen is collected in a central location within the colony and spoilage or contamination due to outside conditions is essentially eliminated. Also, the mounting of the pollen trap in the drawer and its location with respect to the scraper screens has been found to provide the necessary ventilation to retard mold, mildew and other forms of spoilage.

Further features and advantages of the invention will become more readily apparent from the following detailed description of a preferred embodiment when taken in conjunction with the accompanying drawings.

BRIEF DESCRIPTION OF THE DRAWINGS

FIG. 5 is a perspective view of the drawer and pollen container of this embodiment.

FIGS. 6 and 7 are views in perspective of the opposing sides of the scraper means of the present embodiment.

FIG. 8 is a side view in section of the housing.

FIG. 9 is a front view in section taken along line 9—9 of FIG. 8.

FIG. 10 is a partial front view of the housing of FIG. 8 with the scraper means inserted therein.

DESCRIPTION OF THE PREFERRED EMBODIMENT

Figure 1:
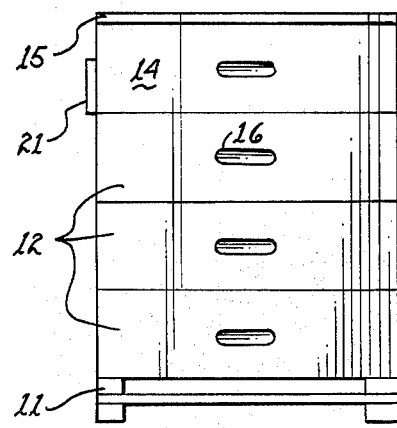
FIGS. 1 and 2 show a side view of the present invention utilized in the top position of a segmented bee colony in non-trapping and trapping operations respectively.
Figure 2:
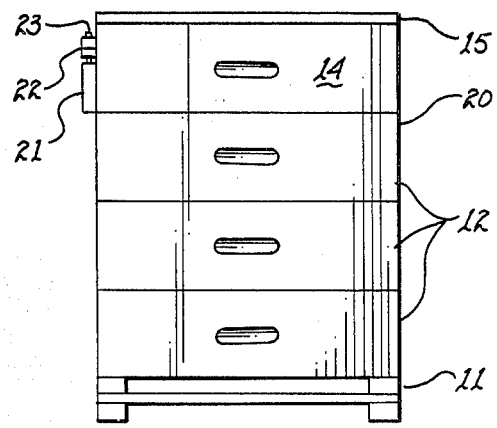

Referring now to FIGS. 1 and 2, a segmented bee colony is shown including a supporting base 11 with a number of hive and honey collecting supers or segments 12 thereon. The present invention 14 is positioned at the top of the segmented bee colony and is capped with a lid 15. The individual segments are provided with recessed gripping areas 16 to facilitate stacking and disassembly prior to moving the colony.

FIG. 1 shows the described embodiment in a non-trapping position at the top of the colony. The housing 20 is shown containing drawer 21. In FIG. 2 the embodiment is seen with the scraper means 22 partially withdrawn from the housing and held in this position by locking pin 23. This shows the top trapping position of the present invention.

The use of the segmented bee colony with the stacked supers and hives is common practice in the industry. The individual hives and supers are open at top and bottom and are adapted for use with elevating base members which provide a bottom or near ground-level bee entry to the colony and top lid members which normally do not permit access to the colony from the outside.

Figure 4:
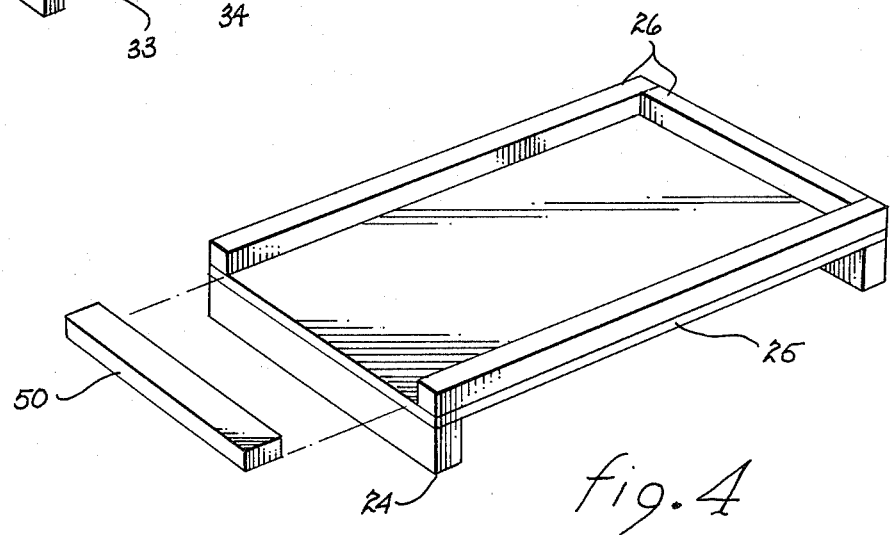
FIG. 4 is a perspective view of the colony supporting base.

Since all segments of a colony communicate internally, the single bottom or base entryway is the typical manner of providing access to the colony during normal operation. In different regions of the country, it is common to affix the base to the bottom super in the colony. The elevating base structure is shown in FIG. 4 including supporting legs 24, which rest on the ground and elevate the base board 25 from ground level. The three edge supports 26 are mounted on the base board so as to provide the bee entry opening at one end thereof.

Figure 3:
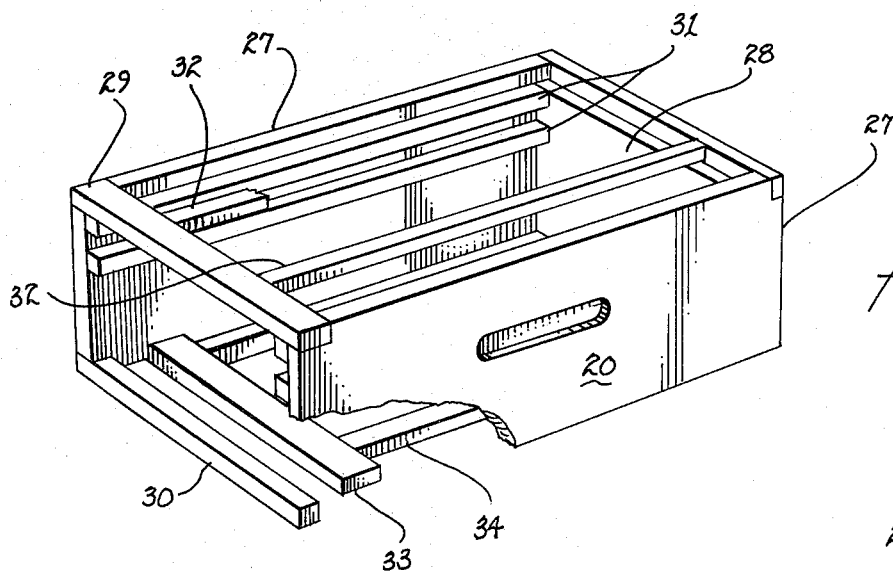
FIG. 3 is a perspective view in partial section of the housing member of the described embodiment.

The housing of FIG. 3 is placed directly upon the elevating base structure for use as a bottom position pollen trap. The housing formed with opposing side walls 27, back wall 28 and front wall supports 29 and 30 is open on the top and bottom for communication with other segments of the bee colony. The front wall supports are spaced to permit the insertion of a drawer and an overlying scraper tray within the housing.

The housing 20 contains guideways 31 on each sidewall 27 to slidably receive the scraper tray. The top struts 32 are provided to impart additional rigidity to the housing structure. In the bottom portion of the housing and spaced rearwardly of the front wall are cross support 33 and lengthwise supports 34 extending to the back wall. These supports impart rigidity to the housing and receive the drawer on their upper surface when it is inserted into the housing. As shown, the side walls of the housing contain a recess for providing a handhold in order to facilitate lifting.

The drawer containing the pollen trap is shown in FIG. 5 and includes a front wall formed of the exterior cover 35 and the internal sealing member 36 adjacent thereto. The cover 35 extends across the front wall of the housing when the drawer is in place while sealing member 36 extends between the internal surfaces of the sidewalls 27 of the housing. Opposing side walls 39 are fastened to sealing member 36 and each is provided with a brace 37 at the juncture therebetween. Each side wall 39 contains a notch 38 or portion of reduced height adjacent sealing member 36 which is adapted to receive wooden cleat 50. Wall 51 is positioned between sidewalls 39 and is spaced from sealing member 36 to form a passageway therebetween which can be closed by placing the cleat into notches 38.

At the rear of the drawer, cross member 41 is fastened to the ends of side walls 39. As shown, the cross member 41 has a reduced height compared to the side walls and has a rear facing chamfer. Cross piece 40 having a mating wedgeshaped lower edge resides on the chamfer surface of cross member 41. Cross piece 40 is affixed to the rear member 44. Rear member 44 along with side members 43 and front member 52, form the rectangular support for the foraminous upper surface 45 of the pollen trap. The trapped pollen passes through this surface when it is dislodged from the bees as will later be described.

The rectangular support for the upper surface is held in position by a pair of retaining pins 48 extending through sidewalls 39 and into front member 52. Removal of the pins permits the rectangular support to be removed to permit access to trapped pollen. In addition, removal of the pins enables the rectangular support to move to an inclined position with front member 52 resting on the bottom screen surface 46. The movement of the upper surface and its support structure to the inclined attitude is due to the rotational movement of cross piece 40 on the chamfer of cross member 41. If desired a hinged connection can be provided therebetween.

When inclined as mentioned, the pollen trap can be used as a food and water source for the bee colony by placing a tray of water or food supplement within the pollen trap. The tray rests on the fine mesh screen 46 that forms the bottom of the trap. While it is urged that a mesh screen be utilized as the floor of the pollen trap to provide good ventilation, it is recognized that a solid base can be utilized in some applications.

The length of the drawer structure containing the pollen trap is less than the depth of housing 20 or the length of its sidewalls 27 in order to provide a passageway for bees therebehind. Thus, passageways are provided both in front of and in back of the pollen trap. In addition, the spacing between side walls 39 of the drawer is less than the spacing between opposing guideways 31 mounted on the side walls 27 of the housing. As a result, side bee passageways are provided around the entire peripheral region of the pollen trap. When the drawer is inserted into the housing it slides on supports 33 and 34 and sealing member 36 extends vertically to the adjacent edges of the lower guideways.

Access by the bees to the aforementioned passageways surrounding the centrally located pollen trap can be regulated by the use of the overlying scraper means with the exception of the front which is controlled by the use of removable cleat 50. The scraper means shown in FIGS. 6 and 7 is slidably mounted between the guideways 31 of housing 20 and is dimensioned to extend between the rear wall 28 of the housing and the outer surface of the front wall thereof. The scraper means is capable of being withdrawn partially or fully and then rotated 180 degrees and reinserted for different operations at different locations in the colony.

As seen in FIG. 6, the scraper means includes a base member 60 which is dimensioned to fit between the guideways 31 of housing 20 and extend between the guideways and the front and rear wall thereof. The base member 60 is provided with a central opening 61 that is covered with a wire mesh screen 65. Two spaced longitudinal supports 62 extend across opening 61. A trash barrier 68 is affixed to supports 62 and is therefore spaced by the thickness thereof from the opening. A fixed blocking member 63 having a height approximately equal to the upper guideway 31 on housing 20 is mounted on base member 60 at the front edge thereof.

In FIG. 7, the scraper means is shown in a rotated position with the wire mesh screen 65 retained in position by edge members 64, longitudinal supports 67 affixed to transverse elevating strips 66. A beveled rear sealing strip 69 is shown extending between edge members 64 at the rear edge of base member 60. The transverse spacing of the edge members 64 is made approximately equal to the spacing between the notched portions 38 of the housing side walls. The height of these edge members is made approximately equal that of the lower portion of guideway 31 on the side wall of the housing. The insertion of the scraper means in housing 20 in the position shown in FIG. 6 results in blocking member 63 occupying the space between the adjacent guideways 31, front wall support 29 and the base member 60. This relationship is shown in the partial front view of FIG. 10. Also, it should be noted that a portion is removed from one edge of blocking member 63 to provide a gap 70 which permits the ingress and egress of the larger size drone bees to the colony without their having to encounter the scraper means.

When the scraper means is inserted in the housing in overlying relationship to the pollen trap drawer as shown in FIG. 10, the edge members 64 extend downwardly to be next to the top surfaces of the side walls 39 and thereby prevent the passage of bees therebetween. If the trap is utilized on the base structure of FIG. 4 in the bottom trap position, trash barrier 68 prevents the cleaning activities of the bees in the overlying super and hive segments from causing debris to impinge on mesh screen 65 and possibly pass through into the pollen trap and contaminate previously trapped pollen.

The withdrawal, rotation and replacement of the scraper means from the position shown in FIG. 10 results in the blocking member 63 effectively closing off the entry between cover 35, the lower portions of the guideways 31 and the base 20. In addition, the passageway from the side of the pollen trap to the central opening of base 20 is not blocked since the edge members 64 are now in the top position.

In both positions of the scraper means and when it is fully inserted, the rear sealing strip 69 is located at the rear wall of housing 20 and does not provide any sealing function. However, in the position shown in FIG. 10, a partial withdrawal of the scraper means results in the rear sealing strip being placed next to the top surface of back support 40 to prevent the passage of bees therebetween. This corresponds to FIG. 2 wherein a locking pin 23 is inserted through hole 72 in the scraper means into receiving hole 49 of the drawer. The use of the locking pin is to both insure proper registration and to prevent any untended disturbance of the operation of the pollen trap.

The apparatus is shown assembled in the section views of FIGS. 8 and 9 wherein the cooperation between housing, drawer, pollen trap and reversible scraper means can be described in terms of the trapping and non-trapping functions. In the situation where trapping is desired and the apparatus is placed directly on the base structure of FIG. 4 in the bottom trapping position, the bees enter through the base structure, the scraper means is fully inserted and preferably rotated from the orientation shown to permit utilization of the side passages. In either position, the blocking cleat 50 is inserted between edge members 64. The bees travel upward to the super and hive segments on all sides of the pollen trap contained in the drawer. In order to continue the travel upward, they must crawl through the mesh 65 of the scraper means which in most applications is comprised of two adjacent mesh screens slightly offset. When crawling through the screens, the pollen is dislodged from their bodies and falls through the openings in upper surface 45 of the pollen trap.

In the testing of the preferred embodiment it was found that the pollen yield tended to decrease with the time due to the bees gaining the ability to more easily travel through the screen. Consequently, the adjacent mesh screen are preferably not fixedly mounted on the scraper means in order that they may be moved relative to each other in order to change the shape and size of the opening. After adjustment, the pollen yields were found to have improved.

To utilize the nontrapping mode in this bottom trap position in the colony, the blocking cleat 50 is removed from its position about the base 60 between edge members 64 and placed in the base entryway as shown in FIG. 4 to deny the bees access thereto. The bottom-trapping position has the advantage of not altering the flight path while trapping. While many beekeepers utilize bottom trapping, preferences vary and the equipment, for example integral base colonies, require different placement in the segmented colony.

The middle trapping position is used when the base structure is affixed to the bottom segment, typically the brood chamber. In this mode of operation, a blocking cleat 50 or the equivalent is utilized to deny access through the base structure. The present invention is positioned at the desired level in the colony with the scraper means oriented as shown in FIGS. 8, 9 and 10. The scraper means is partially withdrawn to and fastened in its second position with blocking cleat 50 placed in the drawer as shown in FIG. 3 to block the first passageway. Thus, the bees enter between the front wall 35, 36 of the drawer and the base 60 of the scraper but are required to climb upward through the mesh screen 65 due to the confining action of the edge members 64 at the sides and the rear sealing strip 69. The bees can travel directly upward and can pass downward via the second or rear passageway formed between the back wall 28 of the housing and cross members 40 and 41 and sealing strip 69.

Non-trapping in the middle position can be readily provided by either withdrawing scraper means 22 completely from the housing or rotating it 180 degrees and returning it to the second or partially withdrawn position and removing the wooden cleat 50. The bees enter above the base 60 and can go directly upward or pass down through the aforementioned first and second passageways.

Top-trapping operations with the present invention placed at the top of the colony are preferred when the colonies are to be frequently moved. Colonies are normally not moved with the pollen trapping on and in position. To utilize this invention in the top position in its trapping mode of operation, the position and orientation of the scraper means 22 and wooden cleat 50 is the same as for middle trapping. Non-trapping is provided in this position by placing the scraper means in the fully inserted or first position and removing the cleat whereupon the bees have downward access through the first and second passageways.

In all three positions the use of a removable wooden cleat 50 permits the pollen trap to be effectively sealed during periods of chemical spraying. A second cleat used at the bottom results in the shutting-in of the entire colony. Since the pollen is stored in a central region within the colony with adequate ventilation provided the present invention results in reduced spoilage of the entrapped pollen.

In addition, the invention provides access on all sides of the pollen trap when the invention is used in the bottom position thus permitting the bees to maintain the clean environment they are noted for. And, the trap is elevated in this position to reduce spoilage from ground moisture and the trapped pollen is not subject to contamination by small animals.

The ability to perform the trapping and non-trapping operations in any position within the segmented bee colony is particularly important since the operator cannot continually trap and deprive his bee colonies of the pollen they need for sustenance. Consequently, the trapping and non-trapping is alternated often times in less than 10 day intervals. Heretofore, this has required skilled labor to continually rearrange the stacked segments for prior internally situated pollen traps. The present pollen trapping structure permits rapid conversion from one type of operation to the other with substantial savings in time and labor.

While the foregoing has referred to a particular embodiment of the invention it is recognized that many modifications and variations may be made therein without departing from the scope of the invention as set forth in the claims.

I claim:

1. Pollen trapping apparatus for placement at different levels in a segmented bee colony, said apparatus comprising:
    (a) a housing member having a front wall, opposing side walls and a back wall for insertion in a segmented bee colony, said housing being dimensioned to fit within the segmented colony;
    (b) a drawer slidably mounted in said housing; and having a front member and opposing side members;
    (c) a pollen trap contained within said drawer and being spaced from the front and back walls of said housing member to form first and second bee passageways respectively, said trap having a foraminous upper surface to permit the passage of pollen therethrough;
    (d) scraper means movably mounted in said housing and being dimensioned to extend between the front and back walls thereof, said means being spaced from adjacent portions of said front wall and positioned in overlying relationship to said drawer for removing the pollen from bees passing therethrough and being spaced from the upper surface of said pollen trap whereby pollen removed from the bees enters the pollen trap through the upper surface thereof, said scraper means being movable between first and second positions to control access to the second bee passageway, and
    (e) means for receiving an entry blocking member in the front wall of said housing adjacent said scraper means to control the location of the bee entryway therein above and below said scraper means and permit non-trapping operation of said apparatus.

2. Apparatus in accordance with claim 1 further comprising means for controlling access to said first bee passageway, said means being contained in said drawer.

3. Apparatus in accordance with claim 1 wherein said scraper means includes an access control member extending thereacross proximate to the back wall of said housing when in said first position, the control member extending between the scraper means and pollen trap when in the second position to control access to the second bee passageway.

4. Apparatus in accordance with claim 3 wherein said scraper means is slidably mounted in said housing.

5. Apparatus in accordance with claim 4 wherein said scraper means contains an entry blocking member extending thereacross proximate to the front wall of said housing.

6. Apparatus in accordance with claim 5 wherein the housing includes guideways extending along the sidewalls to receive said scraper means.

7. Apparatus in accordance with claim 6 wherein said scraper means is a substantially planar member having a centrally located foraminous portion therein.

8. Apparatus in accordance with claim 7 wherein the entry blocking member of the scraper means extends between said guideways adjacent to the front wall of said housing member when the scraper means is in the first and second positions.

9. Apparatus in accordance with claim 8 wherein said scraper means is movably mounted in said housing to permit complete withdrawal therefrom and reinsertion in a rotated position whereby the entry blocking member can be utilized to deny entry above and below the scraper means.

10. Apparatus in accordance with claim 9 wherein said scraper means includes retaining means for receiving a blocking member placed within the front wall of the housing member to thereby deny entry concurrently above and below the scraper means.

11. Apparatus in accordance with claim 10 further comprising fastening means for securing the scraper means in the second position.

12. Apparatus in accordance with claim 3 wherein said housing member is open on the top and bottom thereof to permit placement within the segmented bee colony.

13. Apparatus in accordance with claim 12 wherein said pollen trap is positioned within said drawer to be spaced adjacent the side walls of the housing member.

* * * * *